United States Patent [19]

Linder et al.

[11] 4,058,255
[45] Nov. 15, 1977

[54] HEATER CONTROL FOR A MOTOR VEHICLE

[75] Inventors: Ernst Linder, Muhlacker; Wilhelm Hertfelder, Steinenbronn; Eberhard Schnaibel, Hemmingen; Erich Junginger, Stuttgart, all of Germany

[73] Assignee: Robert Bosch GmbH, Stuttgart, Germany

[21] Appl. No.: 702,087

[22] Filed: July 2, 1976

[30] Foreign Application Priority Data

July 11, 1975  Germany ............................. 2531015
Apr. 9, 1975  Germany ............................. 2615476

[51] Int. Cl.² ........................................... B60H 1/02
[52] U.S. Cl. ............................. 237/12.3 B; 62/209; 236/9 R; 236/91 F
[58] Field of Search .............. 237/12, 3 B; 236/91 F, 236/91 G, 37, 78 B, 46 F, 15 BB, 9 R, 84; 62/209

[56] References Cited

U.S. PATENT DOCUMENTS

| | | | |
|---|---|---|---|
| 2,252,142 | 8/1941 | Simon | 236/37 |
| 2,782,994 | 2/1957 | Dotson | 236/78 B |
| 3,149,293 | 9/1964 | Farkas | 236/46 F X |
| 3,658,244 | 4/1972 | Caldwell | 236/37 |
| 3,995,810 | 12/1976 | Banks | 236/91 F X |

Primary Examiner—William E. Wayne
Attorney, Agent, or Firm—Edwin E. Greigg

[57] ABSTRACT

A heating system for a motor vehicle has temperature sensors for gauging the compartment temperature as well as for gauging the temperature of the effluent hot air. These sensors are connected in series, with the compartment sensor generating the more significant control signal. The flow of heating medium, for example engine water, is regulated by a valve under the control of a regulator which compares the sensors signals with a set-point value. The valve may be cyclically actuated by pulses of fixed frequency but having a width which depends on the results of the signal comparison.

16 Claims, 6 Drawing Figures

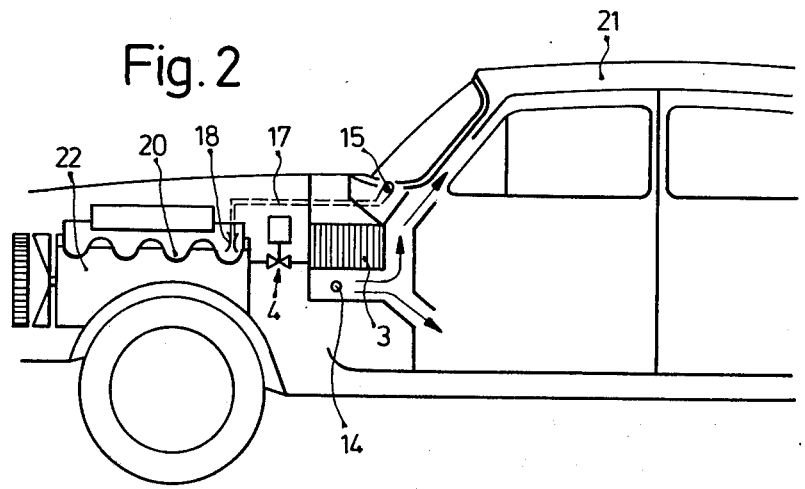
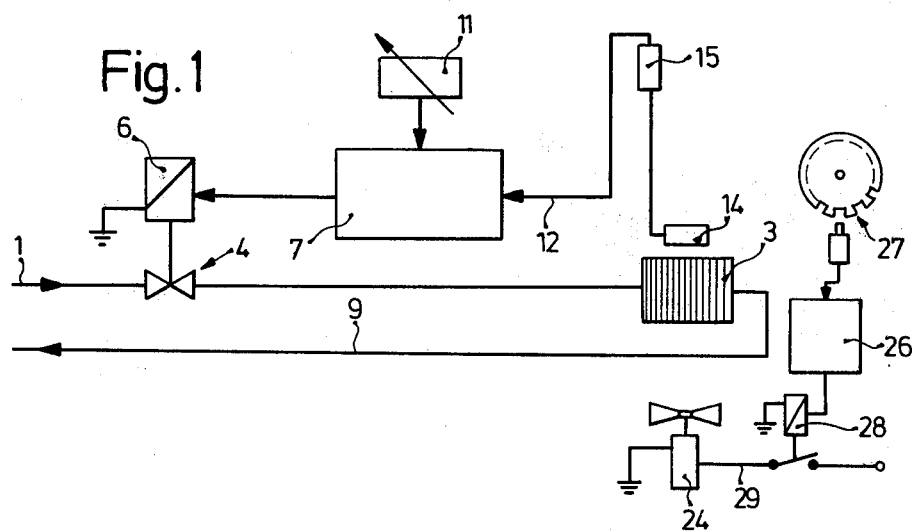
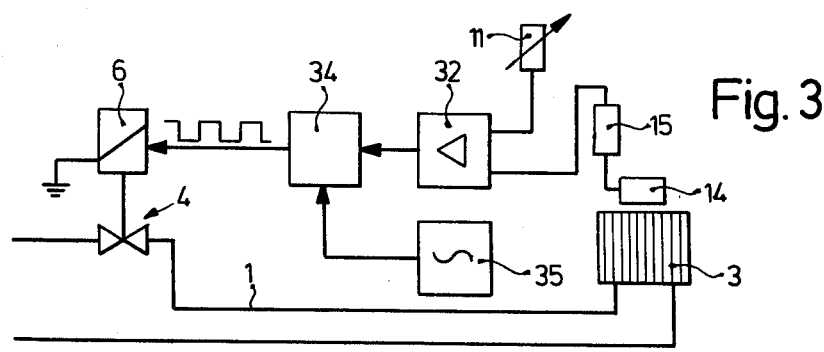

HEATER CONTROL FOR A MOTOR VEHICLE

BACKGROUND OF THE INVENTION

The invention relates to an apparatus for controlling the heating of the passenger compartment in a motor vehicle. The apparatus includes a heat exchanger and a control element for regulating the flow rate of the heating medium and a controller which incorporates a room temperature sensor and a heating air current temperature sensor located at the air outlet of the heat exchanger. The controller also provides for an adjustable nominal temperature.

In a known system for heating the passenger compartment of a motor vehicle, the air outlet is controlled. In another control system, a series-connected room temperature sensor and exterior temperature sensor are coupled to an adjustable resistor. The electric circuit also includes the controller itself and an electromagnetic valve for operating a bypass conduit around the heat exchanger. Depending on the magnitudes of the variables measured by the sensors, the bypass valve is opened and closed. In this type of control, the flow rate of the heating medium is changed in dependence on the exterior and interior temperatures and an adjustable nominal value, and these three magnitudes are used in summation. However, this type of control does not permit an exact comparison with the nominal value corresponding to a desired temperature.

OBJECT AND SUMMARY OF THE INVENTION

It is a principal object of the invention to provide a controller for the heating system of a motor vehicle which has rapid response and permits precise control with relatively low expense.

This object is attained according to the invention by connecting the interior temperature sensor and the heating air temperature sensor in series. The invention further provides that the effect of the interior sensor is greater than that of the heating current sensor, i.e., that the change in the magnitude of the control variable per unit temperature provided by the interior temperature sensor is greater than that provided by the heating air temperature sensor. This arrangement has the advantage of taking account of the temperatures which directly affect the heating dynamics and comparing them with the preadjusted nominal value. A substantial characteristic of the invention is that the variables which are measured by the sensors enter the system with different weight or valence in such a manner that, for a given temperature change, the compartment temperature sensor provides a significantly greater control effect than does the hot air temperature sensor. In this manner, even very small changes in the interior temperature can be recognized and in addition, a cold passenger compartment can be rapidly heated. The presence of the hot air temperature sensor prevents an oscillation of temperature caused by the internal heat capacity of the heat exchanger.

Another feature of the invention provides that the compartment temperature sensor is located at the terminus of a tubulation which communicates through a throttle with the induction tube of the engine so that small amounts of air from the passenger compartment pass through this tube. This design increases the measurement precision of the compartment temperature measurement by preventing any influence from stagnant heat in the vicinity of the sensor which could be dependent on uncontrollable conditions such as, for example, solar radiation.

The ventilation of the temperature sensor is achieved with very little expense because use is made of the induction tube vacuum which is always available without supplementary and additional apparatus.

A further embodiment of the invention provides that the final control element is a valve located in the heating medium inlet of the heat exchanger and provided with an actuating mechanism coupled to the controller and capable of cyclic actuation by pulses of fixed frequency but variable width. The width of the pulses can be changed depending on the deviation of the control variable from the command variable, where the control variable is made up of the sum of the outputs of the compartment sensor and the hot air sensor, the net effect of the former being greater than that of the latter. This disposition has the advantage that a relatively simple valve can be used to control the supply of heat to the heat exchanger. Within the control domain, the valve alternates between an open and closed position at fixed frequency and thus can be of simple construction and will be free of hysteresis while being very reliable. Thus, it is possible to avoid the extra expense and complication which would be required in a continuous change of the flow cross section of a valve in the inlet to the heat exchanger. On the other hand, this disposition brings the advantage that the temperatures which directly affect the heating process are recognized by the controller and are separately compared with a preset command variable. It is also essential, as already mentioned, that the effect of the sensors on the controller is different so that the compartment sensor has a substantially greater effect on the controller for a given temperature change than does the hot air temperature sensor. This feature insures that even very small changes in the interior temperature are rapidly recognized and the cold passenger compartment can be heated very rapidly.

The presence of the hot air temperature sensor prevents a temperature oscillation due to the inherent heat capacity of the heat exchanger. This is especially important during the initial heating phase of the passenger compartment. Since the hot air temperature sensor has a relatively small effect on the controller, the relatively high temperature of the heat exchanger does not affect the controller in a very important way so that the heating effect is reduced only when the compartment temperature approaches the nominal command value. Once the compartment temperature has entered the control range, the controller rapidly reacts to a temperature change induced by the control process through a recognition of the heat exchanger temperature.

Yet another embodiment of the invention provides that the response time of the hot air sensor is less than one period of the pulse train for actuating the control valve. This feature insures that the net control effects of the hot air temperature sensor, i.e., the change of the control variable as a function of temperature, can be very small since any change in the control variable is very rapidly translated into a change of the flow rate of the medium.

An advantageous feature of the invention provides that the command variable is generated by an adjustable electric resistor with a nonlinear progressive characteristic. Such a resistor can be used to compensate the deviation from proportionality of the compartment temperature with respect to the command variable as the value of the command variable increases.

The invention will be better understood as well as further objects thereof become more apparent from ensuing detailed description of three exemplary embodiments taken in conjunction with the drawing.

BRIEF DESCRIPTION OF THE DRAWING

FIG. 1 is a schematic diagram of a heat control system according to the invention;

FIG. 2 is a illustration showing the location of parts of the heating system in a motor vehicle;

FIG. 3 is a schematic diagram of the heating system of the invention in a second embodiment including cyclic actuation;

DESCRIPTION OF THE PREFERRED EMBODIMENTS

Figure 4:
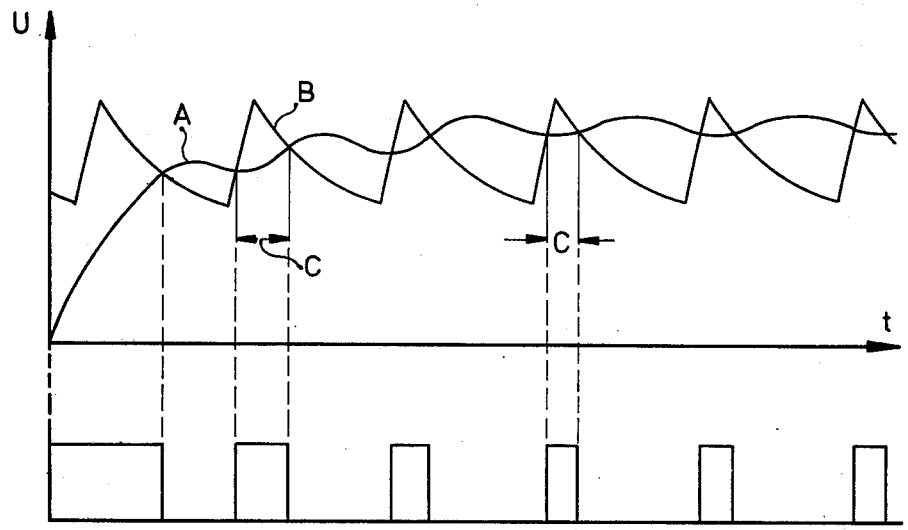
FIG. 4 is a diagram illustrating the valve actuation pulses and the temperature sensor voltage as a function of time.

Turning now to FIG. 1, there will be seen an illustration of a heating system according to the invention including a conduit 1 for a heating medium, for example water, supplied to a heat exchanger 3 and including a valve 4 which is controlled by an electromagnetic winding 6 via a controller 7. The heating conduit 1 is branched off in the usual manner, for example from the cooling system of an internal combustion engine, and is returned to this system after passing through the heat exchanger through a conduit 9. The controller 7 incorporates a command value or set point value generator 11 and is connected through a line 12 with two temperature sensors 14 and 15, themselves connected in series. The temperature sensor 14 is used as a hot air temperature sensor and is located in the immediate vicinity of the air outlet of the heat exchanger 3. The other temperature sensor 15 is used as a compartment temperature sensor 15 and is located in the passenger compartment and in a location which is protected from direct solar radiation. Advantageously, this location would be in the vicinity of the dashboard.

The diagram of FIG. 2 illustrates possible locations for the various elements of the heating system including the two temperature sensors 14 and 15. The location of the sensors directly determines the precision of measurement. For example, the most favorable measurement characteristics are obtained if the hot air temperature sensor is placed wherein the air flow is the greatest and preferably at the hot water inlet side of the heat exchanger. The location of the compartment temperature sensor is also very important in obtaining precise measurements. Its task is to recognize the temperature which is experienced by passengers in the motor vehicle. This same temperature sensor should also respond rapidly to temperature fluctuations such as may occur when the window is opened or when passengers enter or leave the vehicle.

Substantial measurement errors and falsifications may result from accumulated heat or from heating due to radiation. For this reason, as mentioned above, the compartment temperature sensor is located where it is protected from direct solar radiation. In addition, it is disposed at the orifice of a tube 17 which is connected with the induction tube 20 of the engine 22 located within the vehicle 21 through a throttle 18. In this case, the engine itself is the air transporter which, while running, constantly aspirates air from the interior of the vehicle 21 and thus passes it over the compartment temperature sensor so that the temperature to which it is exposed is that of the air in the important portions of the passenger compartment. Even a very small throttle 18 suffices to achieve substantially increased precision of measurement of the compartment temperature and without adversely affecting the operation of the engine. The controller 7 in FIG. 1 is embodied as a simple two point controller which compares the signal provided by the temperature sensors 14 and 15 with a command value from the set point generator 11 and which causes the magnetic winding 6 of the switching valve 4 to be alternately supplied with current, depending on the comparison.

The figure illustrates a simplified series connection of the resistors. It will be understood that the outputs from the temperature sensors may also be combined in some other manner, for example by means of an operational amplifier in a summing circuit.

The two temperature sensors 14 and 15 have the peculiarity that their effects are different. The temperature of the passenger compartment in the vehicle changes much less rapidly than the temperature at the heat exchanger and, for this reason, the compartment temperature sensor 15 is so embodied that it provides a substantially greater control signal than does the hot air temperature sensor 14 for the same temperature change. The rate ratio can range from 1:3 up to 108. The sum of the two signals is fed to the controller 7. The following elements are required for stable operation of the control circuit: the switching valve 4, the heat exchanger 3, the temperature sensors 14 and 15 and the controller 7. If the hot air temperature sensor 14 is left out or else if its effectiveness is too small, then the compartment sensor 15 acts practically alone, which results in an unstable control behavior with wide periodic deviations from the set point value. On the other hand, if the effect of the hot air temperature sensor is made too large, there can be an impermissibly high static control deviation, especially if the heat exchanger requires high temperature. For this reason, the differential effectiveness of the temperature sensors must be maintained and the effect of the hot air temperature must be made as small as possible so as to avoid a large proportional deviation. When the set point value is increased, the addition of the two control variables leads to a relative reduction of the actual compartment temperature because the required higher heat exchanger temperature makes the hot air temperature sensor relatively more effective and makes the compartment temperature sensor relatively less effective.

The aforementioned circuit provides the advantage that, during the initial heating phase, the controller holds the valve 4 open constantly, even though the hot air temperature sensor indicates a temperature which is so high that, in normal operation of the controller, i.e., when the compartment is already warm, this temperature would result in a closure of the heater valve. Once the desired compartment temperature is reached, the compartment temperature sensor, especially due to its ventilation, rapidly shuts off the heater without invoking an overshoot. The forced ventilation of the sensor 15 results therefore in an unfalsified control signal which corresponds to the overall prevailing temperature in the compartment. At the same time, during the initial heating, the full heater power is available and thus insures a rapid heating of the compartment.

The temperature sensors may be embodied as silicon diodes whose different effectiveness may be achieved for example, by using an integrated triple diode as the internal compartment temperature sensor and to use a simple diode as the hot air temperature sensor. Any other heat-sensitive temperature sensors, such as, for example, NTC resistors with different resistivities, may be used instead of the diodes.

In order to decrease the initial heating time and to improve the heating power when the vehicle is standing still or is moving only slowly, there is provided a blower 24 which is controlled by a mechanism 26, for example depending on the velocity of the vehicle, which largely determines the air quantity provided to the passenger compartment and which also affects the air flow rate at the heat exchanger. In one embodiment, the blower remains operative until a vehicle speed of approximately 60 kilometers per hour is reached. A tacho-generator 27 provides an rpm signal to the mechanism 26 which actuates the relay 28 at a certain rpm, resulting in opening and closing the electrical circuit 29.

FIG. 3 illustrates a second embodiment of the invention permitting a somewhat more precise control of the heating process. As in the exemplary embodiment of FIG. 1, the heating conduit 1 leading to the heat exchanger 3 includes a valve 4 whose magnetic windings 6 are controlled by a controller. This embodiment also includes a hot air temperature sensor 14 and a compartment temperature sensor 15 connected in series. A set-point value generator 11 is also provided and the location of the temperarture sensors is the same as in the previously discussed embodiment. The sum of the sensor signals from the sensors 15 and 14 is fed to a differential amplifier 32 which compares this combined signal with the output from the set point generator 11 and feeds the result to a comparator circuit 34. The other input of the comparator circuit 34 receives a sawtooth pulse train from a pulse generator 35. In accordance with the relative amplitudes of these two signals, the comparator 34 generates square pulses which are fed to the winding 6 of the valve 4 and actuate this valve in accordance with the pulse width and frequency. As will be explained shortly, these square pulses have the same frequency as the sawtooth voltage but their width corresponds to the amplitude of the temperature signal from the differential amplifier 32. FIG. 4 illustrates how the square pulses are generated. The curve A is the temperature signal fed to the comparator. The curve B illustrates the sawtooth voltage as a function of time. When these two curves intersect, the comparator generators square pulses whose width is equal to the time of intersection of the curves A and B. The higher the voltage of the temperature signal A, the shorter are the intersection periods C, which, in turn, are equal to the pulse width. When the temperature signal A exceeds the amplitude of the sawtooth voltage, there is no further intersection and no pulses are generated so that the magnetic winding 6 in the valve 4 remains unenergized. On the other hand, if the temperature sensor signal A is smaller than the minimum sawtooth voltage, the magnetic winding 6 remains energized and the valve remains open.

By changing the differential amplitude of the sawtooth voltage, a predetermined proportional control domain may be selected. Above this voltage region, the valve remains closed whereas, below this region, the magnetic windings are energized corresponding to the magnitude of the temperature signal.

The nonlinearity of the portions of the sawtooth voltage are used to advantage in that they compensate for the high nonlinearity of the heat exchanger. If the portions of the sawtooth are made to correspond to exponential functions with different steepness, especially with a rapid onset of voltage and a less rapid decline, then a relatively high temperature sensor signal will result in small changes of the intersection time C as a function of voltage changes whereas, during a low temperature signal, these same voltage changes will result in substantially larger changes of the intersection time C.

The above-described control system provides a quasi-static regulation of the compartment heating and avoids an overshooting during the heating process such as could occur in a normal two-point control system with an unfavorable construction of the heat exchanger. This result is achieved without any additional control elements and expense such as would have to be provided for a continuous, analog type, setting of the flow cross section in the valve of the heater conduit. The valve of the present invention is either completely opened or completely closed in a very simple and reliable manner. A further advantage is derived from the fact that the power requirements for the opening and closing of the valve are very much smaller and the control is much more precise and rapid than would be the case in a continuous setting of the valves which, in addition, would invite substantial hysteresis. Furthermore, the control of the valve of the present invention permits rapid initial heating of the passenger compartment from the cold condition. The present control system operates rapidly and exactly with very little additional cost when compared with heater valves based on bimetallic sensor control. Any requirements for manual adjustments to control the temperature in the compartment are reduced to a minimum. The above-described apparatus has the further advantage of being capable of installation in already existing heater systems.

A further significant advantage of the controller described above is the rapidity of response of the temperature sensors. In order to obtain a precise control response, the response time of the hot air temperature sensor must be shorter than one period of the pulse frequency which controls the switching valve 4 so as to permit the first pulse following a deviation to contain information for reducing that deviation. Furthermore, this frequency must be higher than the characteristic frequency of the heat exchanger and so a rapidly responding hot air temperature sensor must be used. When this is done, the control value generated by the sensor is rapidly recognized by the control system during a temperature change so that the effectiveness, or the weight, of the hot air temperature sensor may be smaller than that of the passenger compartment sensor and once the control system has achieved a temperature lying within the control domain, its only task is to maintain the process stable. On the other hand, the compartment temperature sensor 15 should not have a very rapid response so that, once the control system operates in the control domain, it is not too sensitive to very small temperature changes.

Figure 5:
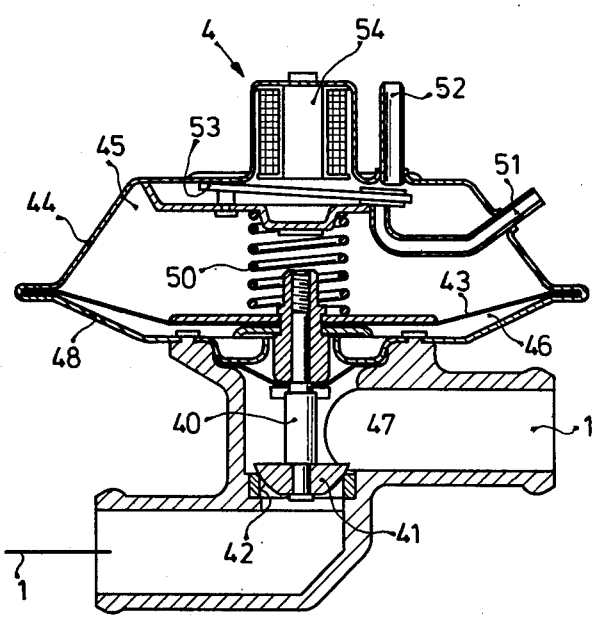
FIG. 5 is an illustration of a valve used in the heating system according to the invention.

The valve 4 may have a known configuration, such as shown in FIG. 5. Such a valve includes a closure member 40 with a valve disc 41 which obturates the flow aperture 42 of the heating medium conduit 1. The closure member 40 is fixedly attached to a diaphragm 43 which separates a control chamber 45 from a reference chamber 46. The reference chamber 46 is sealed from the heater conduit by another diaphragm 47. The reference pressure may, for example, be the ambient atmospheric pressure which is supplied to the reference chamber 46 through a bore 48 in the valve housing 44.

The control chamber 45 includes a spring 50 which urges the diaphragm 43, and hence the closure member 40, to obturate the flow aperture. The control chamber 45 includes two tubes 51 and 52 whose termini are substantially opposite one another. Lying between the two termini of tubes 51 and 52 is a leaf spring acting as a valve member 53 which is fixedly connected to the housing 44 and may be moved by an electromagnet 54. The tube 51, which is connected to the induction tube of the engine, supplies vacuum to the control chamber when the electromagnet 54 is energized. At other times, the control chamber 45 communicates through the tube 52 with ambient air, so that atmospheric pressure prevails and the valve element 40 remains in its closed position, thereby inhibiting the flow of heating medium through the conduit 1.

As soon as the electromagnet attracts the valve element 53, the latter closes off the terminus of the tube 52 so that the control chamber 45 is evacuated through the tube 51 and the valve member 40 is moved in opposition to the force of the spring and opens the conduit 1. It will be understood that the relative movements of the valve elements may be reversed so that, for example, the control chamber 45 is closed off from ambient air when the magnet is not energized and the valve remains open.

The above-described valve has the advantage that it uses the engine vacuum as the power source for the operation of the valve, so that the energy requirements of the electromagnet are very small, making possible a less expensive design of the controller output. The integration of the valve element 53 and the electromagnet 54 within the pressure chamber 44 of the valve results in a very compact construction with low weight and high reliability. Because the manner of operation of this valve is substantially without hysteresis and has very low friction, it results in very high functional precision, thereby permitting simple and precise control.

Figure 6:
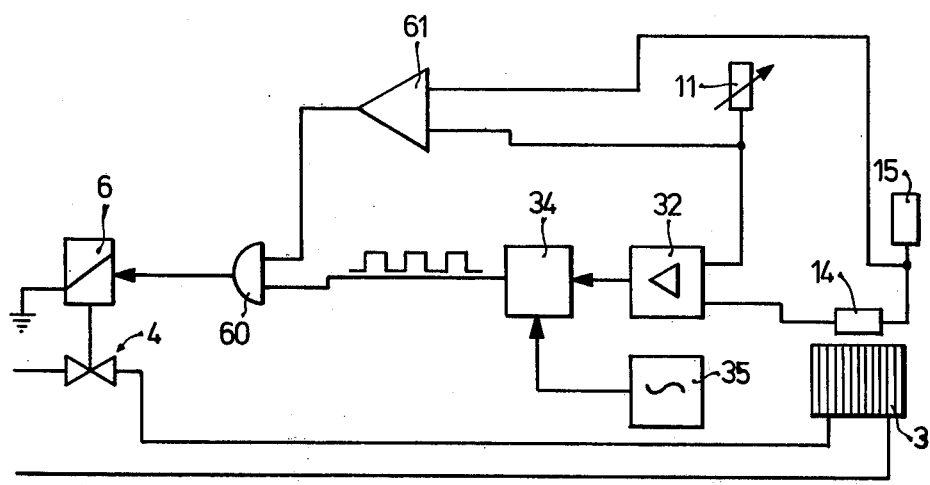
FIG. 6 is a schematic illustration of a third embodiment of the heating system according to the invention including a threshold switch.

A third exemplary embodiment of the invention is illustrated in FIG. 6 and is substantially similar to the embodiment illustrated in FIG. 3. The third embodiment differs from the embodiment of FIG. 3 by including an AND gate 60 in the connection between the comparator 34 and the magnetic winding 6 of the valve 4. A power amplifier may also be included between the AND gate and the valve. The second input of the AND gate is connected to the output of the threshold comparator 61, which may be a known operational amplifier with two inputs, one of which is connected to the set-point generator 11, while the other is connected to the passenger compartment sensor 15. The additional circuitry provides that the magnetic winding 6 of the valve 4 can be energized in the valve-closing direction by the comparator 34 through the AND gate 60 only if the output of the threshold comparator 61 presents an identical signal. This will be the case if the compartment temperature has approached the preadjusted set-point value and, for example, lies within the proportional region of the controller. To ascertain this condition, the threshold comparator 61 compares the output of the compartment temperature sensor 15 with that of the set point generator 11. For proper functioning, the output of the compartment temperature sensor 15 is raised by the amount which corresponds to the temperature deviation beyond which the controller is to begin operating. The same result may be achieved also by appropriate reduction of the set-point value fed to the threshold comparator 61. As long as the compartment temperature remains below the set-point temperature defined in this manner, the control valve 4 remains open at all times. Only when this set-point value is exceeded does the output of the comparator 34 reach the winding 6 of the valve.

The just described system also insures that, when the compartment is still cold, the entire heating power of the heat exchanger 3 is fed to the compartment and thus results in an unregulated, rapid heating of the compartment. Instead of proceeding in the manner illustrated in FIG. 6, it is also possible to engage the differential amplifier or some other portion of the circuit with the output signal from the threshold switch 61. Furthermore, depending on the type of logic of the output signals and of the direction of switching of the valve, some other logical gate, for example a NAND gate, may be used instead of the gate 60.

One disadvantage of summing the signals from the two temperature sensors is that, when the set-point value increases, the increasing influence of the hot air temperature sensor 14 results in a growing deviation of the compartment chamber temperature from the selected set-point. This deviation can be compensated by using a set-point generator which has an increasing characteristic curve. If the set-point generator is displaced in linear manner, its progressively increasing signal can compensate for the deviation from linearity or the decreasing change in the compartment temperature increase. One advantage of this compensation process is that the set-point generator may be a simple variable resistor with only two contacts.

The foregoing represents preferred embodiments of the invention, it being understood that numerous variants thereof are possible within the spirit and scope thereof, the latter being defined by the appended claims.

What is claimed is:

1. A heating system for motor vehicles comprising:
   heat exchanger means, connected to the engine of the motor vehicle for circulation of a heating medium through said heat exchanger means;
   valve means disposed between said engine and said heat exchanger means for controlling the flow rate of said heating medium through said heat exchanger;
   first temperature sensor means, for generating a first electrical signal dependent on the air temperature in the passenger compartment of said motor vehicle;
   second temperature sensor means, for generating a second electrical signal dependent on the air temperature adjacent said heat exchanger means;
   a set point generator, for generating an electrical set-point signal; and
   controller means, for receiving said first and second electrical signals and said set-point signal and for generating an output control signal for actuating said valve means; wherein said first and second temperature sensor means are connected in series and the change in signal from said first sensor means is greater than the change in signal from said second sensor means for the same change in temperature.

2. An apparatus as defined by claim 1, further including a conduit adjacent which is disposed said second temperature sensor and further including air transport means for transporting air through said conduit.

3. An apparatus as defined by claim 2, wherein said air transport means is the engine of said motor vehicle and said conduit is connected to the induction tube of said engine via a throttle.

4. An apparatus as defined by claim 1, wherein said first and second temperature sensors are multiple and simple diodes, respectively.

5. An apparatus as defined by claim 1, wherein said valve means is located in the inlet side of said heat exchanger and wherein said controller means is a two-point controller.

6. An apparatus as defined by claim 1, wherein said valve is disposed in the inlet side of said heat exchanger and wherein said valve is actuated by said controller by pulses of fixed frequency and variable width and wherein said valve opens and closes according to the width of said pulses.

7. A heating system for motor vehicles comprising:
heat exchanger means, connected to the engine of the motor vehicle for circulation of a heating medium through said heat exchanger means;
valve means disposed between said engine and said heat exchanger means for controlling the flow rate of said heating medium through said heat exchanger;
first temperature sensor means, for generating a first electrical signal dependent on the air temperature in the passenger compartment of said motor vehicle;
second temperature sensor means, for generating a second electrical signal dependent on the air temperature adjacent said heat exchanger means;
a set point generator, for generating an electrical set-point signal; and
controller means for receiving said first and second electrical signals and said set-point signal and for generating output control pulses of fixed frequency and of a width corresponding to the deviation of the sum of said first and second electrical signals from said set-point signal, and wherein the change in signal from said first sensor means is greater than the change in signal from said second sensor means for the same change in temperature.

8. An apparatus as defined by claim 7, wherein the response time of said second temperature sensor to changes in temperature is smaller than a single period between sequential ones of said pulses.

9. An apparatus as defined by claim 8, wherein the response time of said second temperature sensor is substantially smaller than that of said first temperature sensor.

10. An apparatus as defined by claim 7, wherein said controller includes a pulse generator for generating a sawtooth voltage of constant frequency, a differential amplifier for receiving said first and second electrical signals and said set-point signal and further includes a comparator for receiving the output from said differential amplifier and said sawtooth voltage for generating rectangular pulses whose width is related to the amplitude of the sum of said first and second electrical signals.

11. An apparatus as defined by claim 10, wherein portions of said sawtooth voltage are nonlinear, especially in the shape of a decreasing exponential function.

12. An apparatus as defined by claim 7, wherein said set-point generator is a variable electrical resistor with a progressive characteristic curve.

13. An apparatus as defined by claim 7, wherein said controller means includes a threshold switch which permits said controller to keep said valve means open independently of said first and second electrical signals.

14. An apparatus as defined by claim 13, further including a logical element connected between the output of said controller means and said valve means a second input of which receives the output from said threshold switch and wherein said threshold switch receives the first electrical signal from said first temperature sensor and said set-point signal from said set-point generator.

15. An apparatus as defined by claim 7, wherein said valve means is a pressure box including a control chamber and an electromagnetic valve for admitting pressure to said control chamber.

16. An apparatus as defined by claim 1, further comprising blower means associated with said heat exchanger means and actuated in dependence on the road speed of said motor vehicle.

* * * * *